US009142839B2

(12) United States Patent
Revol Cavalier

(10) Patent No.: US 9,142,839 B2
(45) Date of Patent: Sep. 22, 2015

(54) ELECTROCHEMICAL BATTERY INTEGRATED IN A PIECE OF CLOTHING AND USING A PHYSIOLOGICAL FLUID AS AN ELECTROLYTE

(75) Inventor: Frédéric Revol Cavalier, Seyssins (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 385 days.

(21) Appl. No.: 13/144,017

(22) PCT Filed: Jan. 19, 2010

(86) PCT No.: PCT/FR2010/000046
§ 371 (c)(1),
(2), (4) Date: Jul. 11, 2011

(87) PCT Pub. No.: WO2010/084265
PCT Pub. Date: Jul. 29, 2010

(65) Prior Publication Data
US 2011/0271424 A1 Nov. 10, 2011

(30) Foreign Application Priority Data

Jan. 20, 2009 (FR) ...................................... 09 00244

(51) Int. Cl.
*H01M 6/04* (2006.01)
*H01M 4/38* (2006.01)
(Continued)

(52) U.S. Cl.
CPC ................ *H01M 6/04* (2013.01); *H01M 6/045* (2013.01); *A41D 1/005* (2013.01); *H01M 4/38* (2013.01); *H01M 6/16* (2013.01); *H01M 6/162* (2013.01)

(58) Field of Classification Search
CPC ......... H01M 6/16; H01M 6/162; H01M 6/04; H01M 6/045; H01M 4/38; A41D 31/00
USPC ..................... 429/127, 347; 2/243.1; 600/573; 450/156; 340/603, 604; 36/132; 128/886

See application file for complete search history.

(56) References Cited

U.S. PATENT DOCUMENTS 215,899 A * 5/1879 Ehrenberg ..................... 429/347
353,346 A * 11/1886 Baldwin ....................... 607/138
(Continued)

FOREIGN PATENT DOCUMENTS

JP          5 21086      1/1993
JP      2002 161410      6/2002
(Continued)

OTHER PUBLICATIONS

Paula Gould, "Textiles gain intelligence", Materialstoday, Oct. 2003, p. 38-43.*
(Continued)

*Primary Examiner* — Kenneth Douyette
(74) *Attorney, Agent, or Firm* — Oblon, McClelland, Maier & Neustadt, L.L.P.

(57) ABSTRACT

The invention relates to an electrochemical battery that comprises at least two electrodes (21, 22) each made of a different conducting material, characterized in that said electrodes are woven or sewn in the fabric of the piece of clothing (1), said fabric containing between 60 and 90% of an animal or vegetal natural fiber and between 10 and 40% of a textile fiber of a chemical elastic material, and using a physiological fluid as an electrolyte. The invention also relates to a piece of clothing equipped with such a battery.

14 Claims, 4 Drawing Sheets

(51) Int. Cl.
   *H01M 6/16* (2006.01)
   *A41D 1/00* (2006.01)

(56) References Cited

U.S. PATENT DOCUMENTS

| | | | |
|---|---|---|---|
| 3,759,246 A * | 9/1973 | Flack et al. | 600/573 |
| 4,770,167 A * | 9/1988 | Kaali et al. | 128/832 |
| 5,242,768 A | 9/1993 | Nagatsuka et al. | |
| 5,959,535 A * | 9/1999 | Remsburg | 340/604 |
| 6,093,869 A * | 7/2000 | Roe et al. | 604/361 |
| 2003/0068559 A1 | 4/2003 | Armstrong et al. | |
| 2006/0021261 A1* | 2/2006 | Face | 36/132 |
| 2007/0249265 A1* | 10/2007 | Delgado-Mecinas | 450/156 |
| 2008/0038588 A1 | 2/2008 | Lee | |

FOREIGN PATENT DOCUMENTS

| | | |
|---|---|---|
| WO | 2006 028347 | 3/2006 |
| WO | 2008 098882 | 8/2008 |

OTHER PUBLICATIONS

Pushparaj. V. L. et al., "Flexible Energy Storage Devices Based on Nanocomposite Paper", Proceedings of the National Academy of Sciences of USA, National Academy of Science, vol. 104, No. 34, pp. 13574-13577, XP-008110890, (Aug. 21, 2007).

Natarajan. K. et al., "Electrotextiles—Present and Future", Materials Research Society Symposium Proceedings, vol. 736, pp. 85-90, XP-009094127, (Jan. 1, 2002).

International Search Report Issued Mar. 24, 2010 in PCT/FR10/000046 filed Jan. 19, 2010.

* cited by examiner

ELECTROCHEMICAL BATTERY INTEGRATED IN A PIECE OF CLOTHING AND USING A PHYSIOLOGICAL FLUID AS AN ELECTROLYTE

The present invention relates to the development of energy micro-sources for supplying electrical or electronic devices.

The miniaturization of electronic components is making it possible to develop numerous small electrical or electronic apparatus, sometimes referred to as nomads because they can be worn by an individual under any circumstances. They are for example lamps, radios, music players, satellite geopositioning apparatus (GPS standing for Global Positioning System), heart rate monitoring systems, or telephones or cameras.

Security and/or military equipment equipped with sensors measuring data relating to the environment (pollution, radioactivity, etc.) or physiological data of the individual wearing the equipment (heart rate, temperature, blood pressure, etc.) may also be mentioned.

One particular field relates to the development of clothing equipped with such electrical equipment.

It goes without saying that all these apparatus need to be supplied with electrical energy, the source of which must be compatible with the use of the nomad apparatus, that is to say lightweight, unencumbering and providing a long-term electricity supply.

While the provision of an energy source offers a certain degree of comfort to the user when equipment intended for leisure is involved, it is an essential requirement for military equipment.

Furthermore, the autonomy of a serviceman is often linked with the energy which he can carry. Since energy is consumable, it is necessary to be able to carry enough of it in order to be sure not to run out. However, the energy sources are heavy to transport and the weight is a critical element for protective or military equipment.

In order to satisfy this demand, attempts have been made for several years to miniaturize the existing cells or batteries and also develop new generations of lithium or lithium ion batteries which are more powerful and can be recharged more rapidly than nickel-cadmium batteries. Lithium ion batteries work on the basis of the reversible exchange of lithium ions between a positive electrode, most often a lithiated transition metal oxide (cobalt or manganese dioxide) and a graphite negative electrode; this requires the use of an aprotic electrolyte (such as an $LiPF_6$ salt dissolved in a carbonate mixture) in order to avoid degrading the highly reactive electrodes.

Fuel cells, in which electricity is produced by the oxidation of a reducing fuel (for example hydrogen) on one electrode coupled with the reduction of an oxidant, such as oxygen from air, on the other electrode, have been developed for electric automobiles and also miniaturized in order to be able to equip individuals and provide the energy required for carried electronic equipment to operate.

The existing systems which make it possible to provide enough energy for the operation of nomad items such as mobile telephones or cameras cannot currently be integrated directly on an article of clothing. Specifically, the necessary energy (of the order of one watt) can to date only be provided by lithium or nickel-cadmium batteries or by miniaturized fuel cells carried in a clothing pocket. These technologies furthermore require complex manufacture with rare materials and liquid electrolytes.

Other energy sources can also provide a power of a few mW by means of thermoconductive cells, but these require the use of complex metal junctions (bismuth, thulium, germanium) or semiconductors, which are a source of pollution. These energy sources are in any event difficult to integrate in clothing and are expensive to manufacture.

An alternative solution for transportable energy sources relates to the production of energy directly by the individual. This is an advantageous approach because it makes it possible firstly to recover electrical energy from the energy expended by an individual, and secondly to limit the external provision of energy to be transported.

Systems for recovering electrical energy generated by an individual have already been described; they involve for example footwear which comprises a piezoelectric device in the sole and generates electricity by deformation of said device during walking (WO 2006/014622). However, the piezoelectric membranes have to be twisted in order to provide energy, and on an article of clothing it is therefore difficult to find a place where such stresses are applied (those most suitable being the soles of footwear) and the energy is only provided when the membrane is subjected to physical activity.

Other techniques make it possible to convert mechanical energy into electrical energy, those best known being the dynamo and the balance watch, which is wound up by using the movement of the hand. Another variant consists in shaking a magnet through a coil and in storing the electricity obtained in a capacitor (Nighstar flashlight lamp from Applied Innovative Technology).

Devices which generate electricity by using the temperature difference between the human body and the surroundings are also being studied. These devices are based on the thermoelectric effect, which is a physical phenomenon existing in certain materials: in these, it relates the heat flux passing through them to the electric current which flows through them. This effect is the basis of electricity generation applications: a thermoelectric material will make it possible to convert heat directly into electricity (Seebeck effect or Peltier effect).

However, none of these energy sources can be incorporated in an article of clothing easily, inexpensively and without the user's comfort thereby being affected.

Cells prepared with flexible materials arranged in sheets have also been described. Although they seem more suitable for incorporation in an article of clothing, their use nevertheless presents certain drawbacks.

Pushparaj et al. have developed cells by depositing layers of material on flexible supports; they have more particularly described a flexible planar cell based on cellulose making it possible to store and generate energy. This cell is composed of carbon nanotubes which are used as a current collector, and a lithium anode. The electrolyte is an ionic liquid such as a potassium hydroxide solution, but the cell also operates with a physiological electrolyte such as blood or urine (*Flexible energy storage devices based on nanocomposite paper*, PNAS (2007) vol. 104 no. 34 13574-13577).

K. B. Lee of the Singapore Institute of Bioengineering and Nanotechnology describes a flexible cell consisting of a piece of paper previously loaded with copper chloride particles, sandwiched between two metal electrodes deposited on a flexible plastic support. The copper chloride particles participate in the electrochemical reaction making it possible to produce electrical energy when the paper is wetted with urine or blood (*Urine-activated paper batteries for biosystems*, J. Micromech. Microeng. 12 (2005) S210-S214).

However, the manufacture of these cells which provide energy from physiological liquids requires the use of expensive materials and complex manufacturing methods. Furthermore, these cells are devices in the form of sheets with a thickness and a stiffness which may be problematic when these cells are incorporated in an article of clothing (risks of discomfort).

Another drawback is that, in order to operate, these cells require a fluidic system intended to deliver the physiological liquid onto the sensor at a precise position of the cell.

Lastly, these cells are made of materials which can be toxic to humans (carbon nanotubes, lithium) and pollute the environment.

It is therefore necessary to develop new energy sources for the operation of nomad electrical or electronic apparatus that generally consume little energy, which do not present constraints in terms of encumbrance for the user.

This is what the Applicant has achieved by developing an electrochemical cell integrated directly by weaving or sewing in an article of clothing, this cell comprising at least two electrodes, each consisting of a different conductive material, and using a physiological fluid as electrolyte. Specifically, sweat, urine or tears can be used as a conductive ionic liquid in order to make the cell operate.

The use of this cell offers several advantages:
- the cell is reduced to the electrodes; it does not therefore require storage of the electrolyte and its weight is thereby reduced;
- no harmful electrolyte is used;
- the electrolyte of this cell can be replenished at will;
- the cell is manufactured at the same time as the article of clothing, and its manufacture therefore does not require an additional step for integrating it in the article of clothing;
- it is also possible to produce the connections of the various batteries present on the article of clothing during manufacture of the article of clothing; for example, it is possible to connect a plurality of cells to one another since it is sufficient to sew or weave the metal wires between these cells in order to connect them in series or in parallel, according to requirements;
- it is not necessary to produce a fluidic system for delivering the physiological liquid onto the cell, since it is sufficient for the physiological electrolyte to impregnate the fabric of the article of clothing in order to be directly in contact with the metal electrodes woven or sewn in the article of clothing. In this regard, the advantageous use of a textile directly molding to the body makes it possible to maintain permanent contact between the electrodes and the bodily fluid produced by the body;
- lastly, the article of clothing remains comfortable; in fact, only a few metal wires are added to the web of the fabric. There are no rigid or flexible attached regions containing the cells, which could impede the wearer of the article of clothing;
- furthermore, by being integrated in an article of clothing, the electrodes constituting the cell can cover a large area without it being necessary to apply a plurality of cells according to the prior art.

According to a first of its objects, the present invention relates to an electrochemical cell comprising at least two electrodes, each consisting of a different conductive material, characterized in that said electrodes are woven or sewn in the fabric of an article of clothing, said fabric containing between 60 and 90% of an animal or vegetal natural fiber and between 10 and 40% of a textile fiber made of an elastic chemical material, and in that said cell uses a physiological fluid as electrolyte.

Conventionally, an electrochemical cell is a device which converts the energy of a chemical reaction into electrical energy. Specifically, the cell comprises a chemical redox reaction between two substances, one of which can easily lose electrons (reducing material) and the other absorb them (oxidizing material). Each of these materials is used to manufacture an electrode. The two electrodes, the anode or (−) terminal produced with the reducing material and the cathode or (+) terminal produced with the oxidizing material, are immersed in an ionic solution referred to as an electrolyte. The electrochemical potential of the two metals constituting the electrodes determines the voltage of the cell. A cell may contain a plurality of pairs of electrodes connected in series.

A physiological or bodily fluid or electrolyte is intended to mean any liquid which contains ions in solution and originates from an animal body, in particular a human body. In what follows, the wearer of the cell according to the invention will be referred to as an individual, irrespective of whether they are an animal or a human.

The physiological fluid more specifically consists of sweat, urine, blood, tears, saliva, lymph or exudate, which refers to a liquid of serous nature due to a modification of the permeability of the membrane of the lymphatic capillaries following inflammation. According to the invention, the physiological fluid is preferably sweat or urine. Sweat is particularly preferred because it can be used when the wearer of the article of clothing is in a situation which leads to natural sweating, for example during physical exertion.

The cell is such that its electrodes are integrated in an article of clothing or accessory intended to be in contact with an individual. It is in particular conceivable to position the electrodes in a woven or nonwoven or knitted textile used to make an article of clothing, or alternatively in any accessory which can come in contact with a physiological electrolyte.

In the scope of the present invention, the term clothing refers both to clothing intended to be worn and to textile accessories worn by an individual.

By way of example and without implying limitation, the term clothing may refer to: a sweater, T-shirt, shirt, pants, skirt, dress, underwear, jacket, anorak, coat, gloves, hat, sling, scarf, headband, dressing, etc.

Preferably, the article of clothing is such that all or part of its surface is in contact with the skin of the individual who wears it, this result being achieved for example by adjusting the cut of the article of clothing to the size of said individual and/or by selecting an elastic fabric which keeps the article of clothing in contact with the skin. An elastic fabric is intended to mean a fabric which stretches under a tensile force and rapidly returns to its initial shape when the tension ceases to be applied.

In this context, the use of a fabric comprising between 60 and 90% of an animal or vegetal natural fiber and between 10 and 40% of a textile fiber made of an elastic chemical material advantageously makes it possible to produce an elastic fabric and therefore an article of clothing which will ensure good contact between the body of the individual wearing said article of clothing and the electrodes, in particular when the bodily fluid is sweat. The use of an elastic fabric is therefore particularly expedient when the article of clothing is worn by an individual engaging in physical activity, the elasticity of the fabric ensuring permanent contact between the electrodes and the sweat of said individual.

The article of clothing may be composed of one or more fabrics. In general, the fabrics will be made using textile fibers composed either of natural materials: of animal origin (wool from sheep, cashmere and mohair from goats, alpaca from llamas, angora from rabbits and goats, silk from silkworm cocoons), of vegetal origin (cotton, flax, sisal, rubber, etc.) or of mineral origin (glass, carbon, metal, etc.); or artificial chemical materials which are derived from cellulose (viscose, modal, acetate, etc.) or synthetic chemical materials which are derived from petroleum products (polyamide, polyester, acrylic, elastane, etc.). Among chemical fibers, some are elastic, that is to say they stretch under a tensile force and return to their initial shape when the tension ceases to be applied; in particular, elastane may be mentioned. The given fabric may also consist of several types of textile fibers.

Thus, in addition to fabric comprising between 60 and 90% of an animal or vegetal natural fiber and between 10 and 40% of a textile fiber made of an elastic chemical material, the article of clothing in which the cell according to the invention is integrated may also comprise one or more other fabrics. This or these plurality of other fabrics will not however constitute more than 50%, preferably 30% and more preferably 15% of the total surface area of said article of clothing.

The person skilled in the art will select the composition of the fabric or mixture of fabrics according to their behavior in the presence of water. This is why it is preferable to use fabrics mainly composed of animal or vegetal natural fibers and mixtures thereof, which are capable of absorbing water or aqueous solutions such as physiological electrolytes.

By way of example, in a particular variant, the fabric comprising between 60 and 90% of an animal or vegetal natural fiber and between 10 and 40% of a textile fiber made of an elastic chemical material is such that said animal or vegetal natural fiber is cotton and/or said textile fiber made of an elastic chemical material is elastane.

The conductive material which can be used to manufacture the electrodes is metal, in particular aluminum, silver, copper, gold etc., for example those marketed by Goodfellow. It is also conceivable to prepare an electrode by metallization of a textile thread using various techniques, for example metal evaporation, cathode sputtering or chemical metallization.

The metal electrodes consist of one or more wires of the same metal. If a plurality of wires are used, each metal wire must be in contact with at least one other metal wire of the same metal in order to ensure electrical continuity of the electrode.

The metal wires may be sewn or woven with threads used to manufacture the article of clothing, so that the surface of the electrode is composed both of metal wires and of textile thread identical to the rest of the article of clothing.

In order to use the cell, conductive materials having a theoretical electrochemical potential difference of at least 200 mV will preferably be associated.

Pairs of electrodes comprising one gold electrode and one aluminum electrode or one copper electrode and one aluminum electrode are preferably used.

According to an advantageous embodiment of the invention, the electrodes are in the form of wires which can be woven or sewn in or on a fabric. The shape, length and surface area of the electrodes may vary widely, comprising in particular a wire or a square, star, circle, etc. with a surface area of between a few square millimeters and a few tens of square centimeters.

The cell according to the invention is prepared by weaving or sewing the electrodes into a fabric without their being in contact with one another, in order to avoid short circuits. They may for example be positioned parallel. Such an arrangement has the advantage that a large number of electrode pairs can be associated.

According to a preferred embodiment, the electrodes, denoted as metal electrode Metal 1 (21) and metal electrode Metal 2 (22) are wires woven into the fabric consisting of the weaving thread (1), terminated by electronic connection pads (31) and (32) located in a hem or a hydrophobic electrical connection region (4) (see FIG. 1); the wires may have a diameter between 20 and 500 μm. However, these values are given completely indicatively since the shape and size of the electrodes will be adjusted by the person skilled in the art according to their intended purpose; in particular, their length is adjusted to the weaving requirements. An advantage of this embodiment is that once it has been woven into the fabric, the electrode develops a great length of wire, thus optimizing the exchange surfaces for the electrolysis reaction.

Another embodiment is schematized in FIG. 2, where ovally shaped electrodes (21) and (22) are sewn onto the fabric; they are connected to other pairs of electrodes, or the apparatus to be electrically supplied, using insulated metal connection wires (51) and (52).

In the scope of using the cell according to the invention, it is possible to place a plurality of cells in series or in parallel according to the desired amount of current or voltage. Specifically, these arrangements may be formed in the lining or the hem of an article of clothing. Thus, in order to have more current or more voltage than are delivered by a single cell, it is possible to connect electrode pairs together in order to obtain enough energy to supply the one or more apparatus to be electrically supplied.

An example of an arrangement of a plurality of electrodes in series is represented in FIG. 3, where each pair of electrodes is separated by an insulating material (6) arranged in the fabric parallel to the electrodes, and where the anode of an electrode pair is connected by a conductive wire (7) (metal wire made using a metal such as copper, aluminum, gold or a metal alloy) to the cathode of the neighboring electrode pair. The conductive wire is positioned in an electrical connection region insulated from the electrolyte, for example a hydrophobic region or inside an insulating sheath.

The hydrophobic region makes it possible to ensure that the electrolyte will not enter the fabric over a certain surface area of the article of clothing, and it thus makes it possible to electrically insulate the cell parts and prevent the electrolyte from short circuiting electrical contacts such as electrical connection regions between the cell and the apparatus to be electrically supplied or between the electrodes and the mounting wires; such short circuits would limit the performance of the cell.

It may also be necessary to position a hydrophobic region transversely (8) with respect to the electrodes (see FIG. 4). Such an arrangement may be useful for delimiting regions used for the production of electricity and regions without an application, or alternatively dedicated to other applications such as the measurement of physiological parameters, for example the measurement of physiological parameters relating to a bodily fluid, in particular the fluid used for the electrolyte. Such parameters may be concentration measurements of ions or other chemical species.

This hydrophobic region may be obtained by screen-printing a hydrophobic material into the fibers of the fabric. The hydrophobic material may be a plastic material such as polyvinyl chloride (PVC) or a film of polyester, for example polyethylene terephthalate (PET); a hydrophobic resin such as an epoxy resin, for instance an Epotek resin (marketed by Epotecny under the reference 06-142) or a Vitralite resin (in particular the one marketed under the reference 1602), a UV-polymerizable resin such as the resin AZ4562 from Clariant, the resin NFR0 15 from Shipley or the Epotek UV 06-12 adhesive; or a hydrophobic protective varnish such as the silicone-based product Electrofuge 200 marketed by KF.

The hydrophobic region may also be obtained by weaving hydrophobic textile fibers such as nylon and polypropylene onto a selected region of the article of clothing.

Lastly, the hydrophobic region may be obtained by sewing or adhesively bonding hydrophobic materials, for example plastics.

An exemplary arrangement of a plurality of electrode pairs in parallel is represented in FIG. 5. The cathodes (21) and the anodes (22) are connected together by connection wires: a cathode connection wire (91) and an anode connection wire (92). This figure represents three batteries (10) connected in parallel.

The physiological fluid necessary for operation of the cell can be provided by the individual when he is in contact with said article of clothing.

According to a particular embodiment of the invention, the electrodes of the cell and the apparatus to be electrically supplied may be connected by a connection wire made of insulated metal. Connection wires made of insulated metal, such as copper, gold, aluminum or a metal alloy, are commercially available. For example, they may be metal wires insulated by a sheath of insulating material such as plastic or PVC, or a hydrophobic varnish.

According to a variant, the cell is connected to an electrical or electronic apparatus so as to ensure operation thereof by virtue of the electricity supply which it generates.

According to this variant of the invention, the cell supplies an electronic or electrical device with electricity.

Electrical apparatus is intended, for example and without implying limitation, to mean a lamp, a heating resistor (in order to heat an article of clothing in order to warm the wearer, and optionally speed up its drying), etc.

Electronic apparatus is intended, for example and without implying limitation, to mean sensors, telephones, GPS apparatus, etc.

The invention is particularly suited to electronic devices with a low electricity consumption, in particular physiological parameter sensors such as, for example and without implying limitation, electrochemical sensors measuring ionic concentrations in body liquids.

By way of illustration, the current produced by a cell according to the invention may be used to supply a device, the use of which is particularly recommended during physical exertion leading to perspiration of the individual wearing the article of clothing/battery. In particular, the cell may supply a sensor determining the dehydration during the individual's exertion by analyzing the composition and water content of the sweat; the sweat is then used as the electrolyte of the cell which supplies the sensor with electricity and as the fluid analyzed by the sensor.

According to another variant, the cell according to the invention supplies a capacitor for storing the electrical energy generated, with a view to subsequently releasing it.

The present invention also relates to an article of clothing equipped with an electrochemical cell formed by at least two electrodes, each consisting of a different conductive material.

There are very many applications of a cell according to the invention:
  it may constitute an energy source for uses of the firefighting or military type for transmitting a signal or the use of a physical or physiological sensor;
  it may be associated with a physiological sensor in a dressing or a bandage and deliver energy using exudate or blood in order to measure physiological data such as: level of a growth factor, number of blood platelets or red corpuscles, or more basically to detect moisture in order to warn the nursing staff of the need to change the dressing or bandage;
  on the same principle, it may be integrated in a disposable diaper and connected to a light-emitting diode in order to turn on a light by generating current when urine touches the electrodes.

The invention will now be described in more detail with reference to the following figures.

EXAMPLE 1

Preparation of a Cell with Gold and Aluminum Electrodes

A piece of silicon with a surface area of 1 cm$^2$, on which a 0.5 μm thick layer of gold (11) is deposited, and a piece of silicon with the same surface area covered with a 0.5 μm thick aluminum layer (12), are immersed in a synthetic sweat solution (13).

The synthetic sweat is composed of 30 mM NaCl, 6 mM KCl and 1.1 mM $CaCl_2$ in water.

Figure 6:
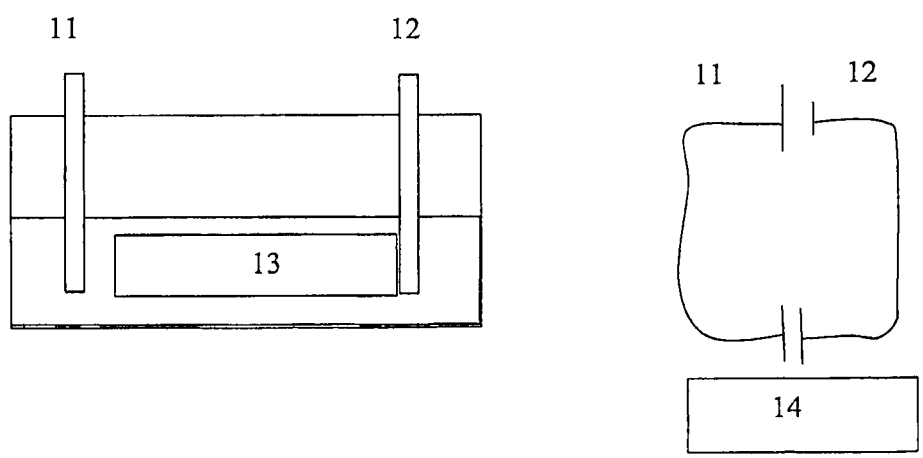
FIG. 6 represents the layout of the gold/aluminum cell used in Example 1.

The two electrodes are connected to a capacitor (14) which becomes charged during the electrochemical reaction (see the layout in FIG. 6).

The results obtained are as follows:

| PD measured | Current measured |
| --- | --- |
| 0.65 to 0.7 V | 150 μA to 200 μA |

EXAMPLE 2

Preparation of a Cell, the Electrodes of which are Woven in a Fabric

Figure 1:
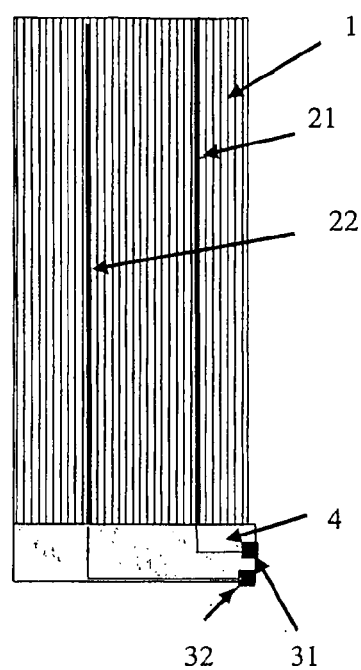
FIGS. 1 and 2 represent two exemplary embodiments of a cell according to the invention.
Figure 2:
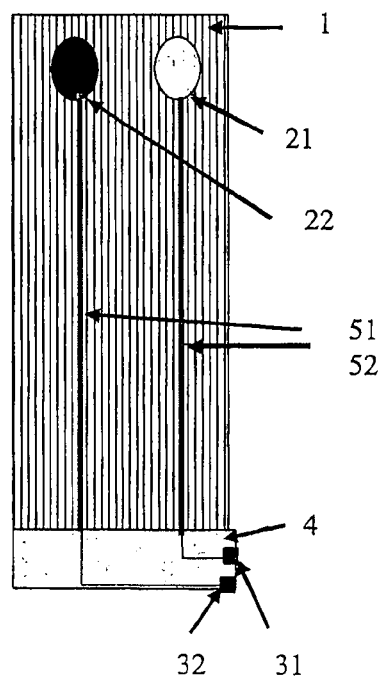
Figure 3:
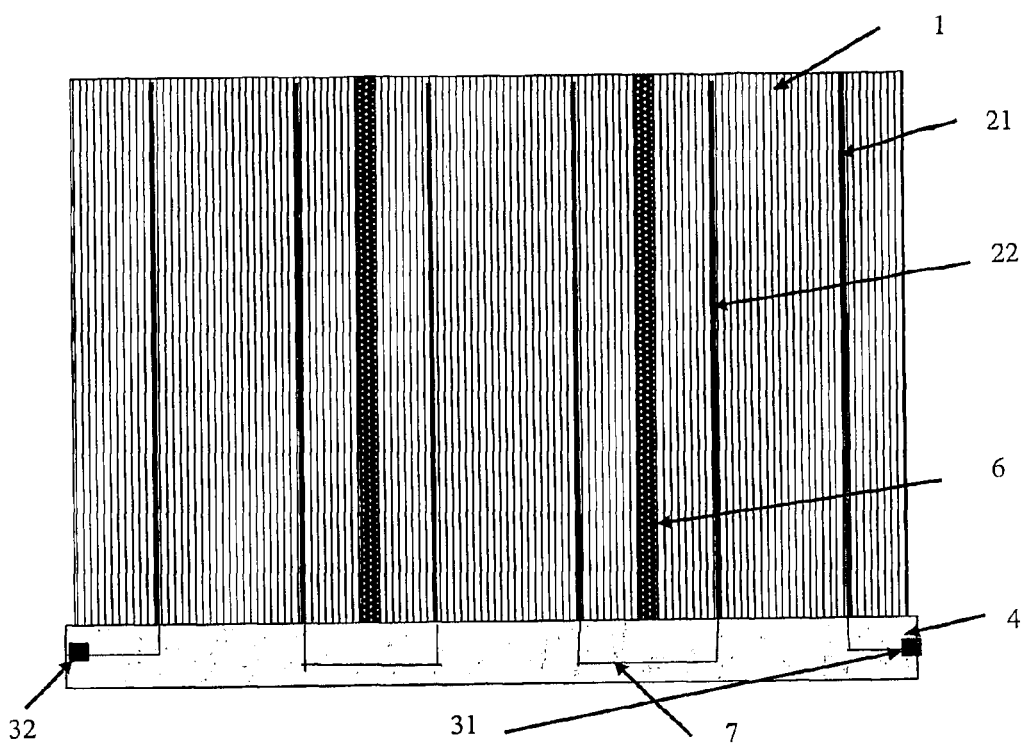
FIG. 3 represents the diagram of a cell comprising a plurality of pairs of electrodes woven in a fabric and connected in series.
Figure 4:
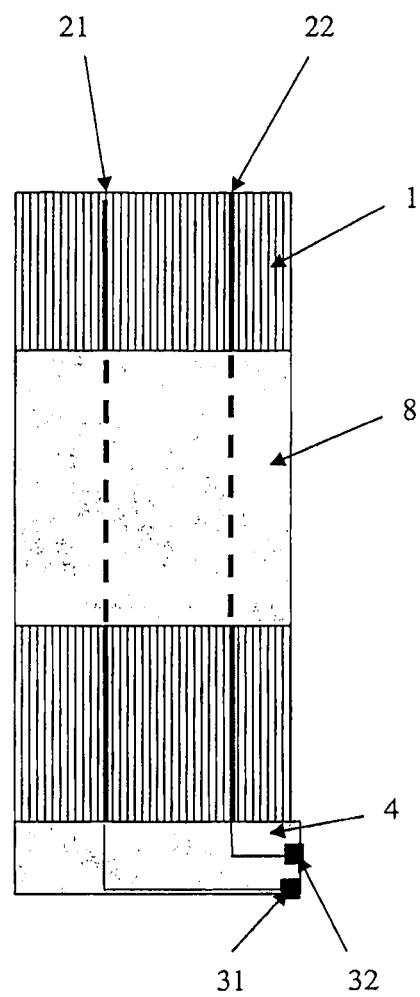
FIG. 4 represents the diagram of a cell comprising a pair of electrodes woven in a fabric comprising a transverse hydrophobic region.
Figure 5:
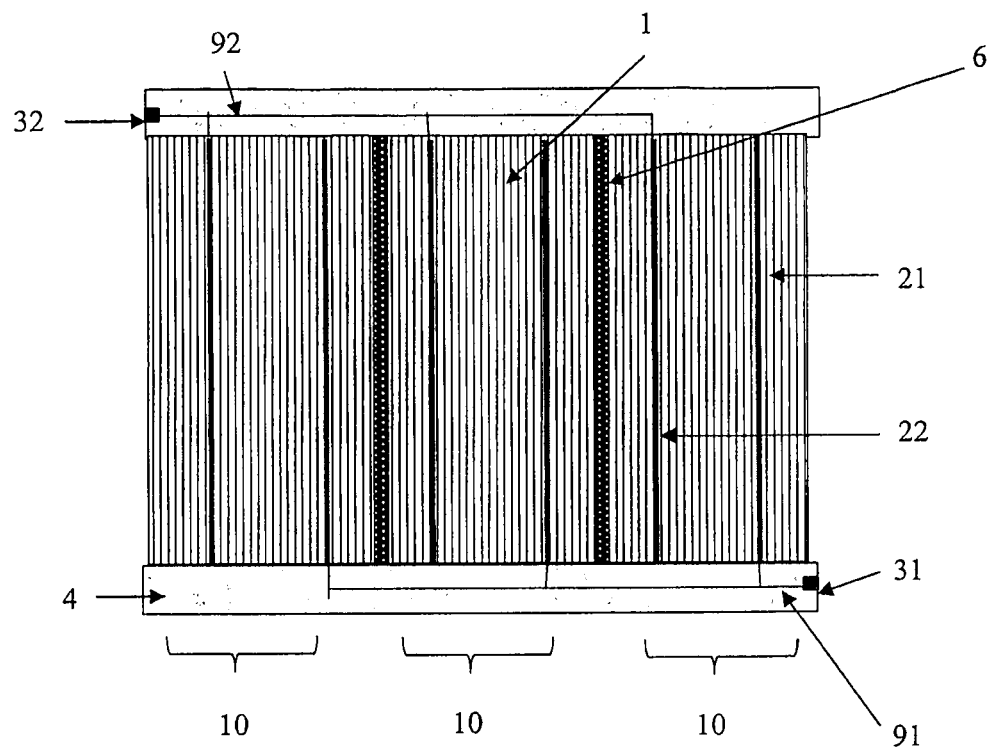
FIG. 5 represents the diagram of a cell comprising a plurality of pairs of electrodes woven in a fabric and connected in parallel.

The arrangement of this example is schematized in FIG. 3.

All the electrodes are woven parallel to one another at a distance of a few millimeters. The anode is made of aluminum and the cathode is made of gold. Each electrode pair is separated by an insulating material (obtained by coating the fabric with Epotek UV 0612 adhesive) arranged in the fabric (a mixture of 70% cotton and 30% elastane) parallel to the electrodes. Lastly, the anode of one electrode pair is connected by a conductive metal wire to the cathode of the neighboring electrode pair.

The invention claimed is:
1. An electrochemical cell, comprising:
  at least two electrodes, each comprising a different conductive material,
  at least two electrical connections, each electrical connection being connected to one of said electrodes,
  wherein said electrodes are woven or sewn in a fabric of an article of clothing, said fabric containing between 60 and

90% of an animal or vegetal natural fiber and between 10 and 40% of a textile fiber made of an elastic chemical material, wherein said cell includes a physiological fluid as electrolyte such that said electrodes are immersed in said physiological fluid and an electrochemical potential of the two electrodes determine a voltage of the cell, and wherein the cell includes an hydrophobic region to prevent the electrolyte to reach said electrical connections, wherein one of said at least two electrodes comprises a reducing material and another of said at least two electrodes comprises an oxidizing material, and wherein said hydrophobic region comprises electronic connection pads connected to said electrodes.

2. The cell as claimed in claim 1, wherein said conductive material is a metal.

3. The cell as claimed in claim 1, wherein the at least two electrodes includes at least two pairs of electrodes connected in series.

4. The cell as claimed in claim 1, wherein said electrolyte is selected from sweat, urine, blood, tears, exudates.

5. The cell as claimed in claim 4, wherein said electrolyte is provided by an individual.

6. The cell as claimed in claim 1, wherein said electrodes are woven or adhesively bonded parallel to one another in or on a fabric.

7. The cell as claimed in claim 1, wherein said animal or vegetal natural fiber is cotton and/or said textile fiber made of an elastic chemical material is elastane.

8. The cell as claimed in claim 1, wherein the cell supplies an electronic or electrical device with electricity.

9. The cell as claimed in claim 1, wherein the cell supplies a capacitor.

10. An article of clothing comprising a cell as claimed in claim 1.

11. The cell as claimed in claim 1, wherein said hydrophobic region delimitates at least two regions used for the production of electricity within said article.

12. The cell as claimed in claim 3, wherein each pair of electrodes is separated by an insulating material arranged in the fabric, and wherein an anode of an electrode pair is connected by a conductive wire to a cathode of a neighboring electrode pair.

13. An electrochemical cell comprising:

at least two electrodes, each comprising a different conductive material, at least two electrical connections, each electrical connection being connected to one of said electrodes, wherein said electrodes are woven or sewn in a fabric of an article of clothing, said fabric containing between 60 and 90% of an animal or vegetal natural fiber and between 10 and 40% of a textile fiber made of an elastic chemical material, wherein said cell includes a physiological fluid as electrolyte such that said electrodes are immersed in said physiological fluid and an electrochemical potential of the two electrodes determine a voltage of the cell, and wherein the cell includes an hydrophobic region to prevent the electrolyte to reach said electrical connections, wherein the at least two electrodes includes at least two pairs of electrodes connected in series, wherein each pair of electrodes is separated by an insulating material arranged in the fabric, and wherein an anode of an electrode pair is connected by a conductive wire to a cathode of a neighboring electrode pair, wherein said conductive wire is positioned in said hydrophobic region.

14. The cell as claimed in claim 1, wherein said hydrophobic region provides an electrical connection region insulated from the electrolyte.

* * * * *